United States Patent [19]

Esposito

[11] Patent Number: 4,498,166
[45] Date of Patent: Feb. 5, 1985

[54] MULTIPLEXER AND DEMULTIPLEXER CIRCUITS FOR ANALOG SIGNALS

[76] Inventor: Anthony Esposito, 159 Connetquot Rd., Oakdale, N.Y. 11769

[21] Appl. No.: 440,866

[22] Filed: Nov. 12, 1982

[51] Int. Cl.³ .............................................. H04J 7/00
[52] U.S. Cl. ...................................... 370/9; 370/119; 370/116; 370/112
[58] Field of Search ................... 370/9, 119, 112, 116, 370/114, 10

[56] References Cited

U.S. PATENT DOCUMENTS

| | | | |
|---|---|---|---|
| 2,548,795 | 4/1951 | Houghton | 370/116 |
| 2,664,509 | 12/1953 | Trevor | 370/116 |
| 3,668,291 | 6/1972 | Slana | 370/116 |

FOREIGN PATENT DOCUMENTS 604817  7/1984  United Kingdom .................. 370/10

*Primary Examiner*—Douglas W. Olms
*Attorney, Agent, or Firm*—Arthur L. Plevy

[57] ABSTRACT

There is disclosed a multiplex system for combining a plurality of analog or other type input signals at a transmitter site to provide a composite signal for transmission to a receiver site via a common transmission channel. At the transmitter, a reference ramp signal is generated and then peak detected to provide a plurality of proportional threshold level signals, each one associated with one input signal. These threshold signals are employed as inputs to comparators which also receive an input signal with one comparator for each input signal or channel. The outputs of the comparators are summed to provide a staircase composite signal for transmission to the receiver site. At the receiver, the staircase signal is peak detected to again provide a series of proportional threshold levels each of which is applied to a separate comparator at one input. Another input of the comparator receives the staircase signal to provide at the output a replica of the original input signal. There is no separate synchronization required by the transmitter and the receiver according to the system operation.

16 Claims, 6 Drawing Figures 4,498,166

MULTIPLEXER AND DEMULTIPLEXER CIRCUITS FOR ANALOG SIGNALS

BACKGROUND OF INVENTION

This invention relates to a multiplex communication system and more particularly to a system which is capable of transmitting a plurality of signal channels over a common transmission line and then deriving each of said channels without the use of a separate synchronization means.

The concept of multiplexing has been widely employed in the communications field and essentially consists of combining two or more signals into a single multiplex signal which signal can be transmitted on a single channel. At the receiving end, the multiplex signal is processed to recover the individual signals.

In any event, many prior art systems utilize relatively complicated circuits to assure that the multiplex transmitter is synchronized with the multiplex receiver. As such, the prior art systems are relatively complicated and difficult to implement. Generally speaking, in most prior art systems, there is a necessity to provide a synchronizing signal which signal is retrieved by a separate circuit at the receiving end and is then employed to assure that the individual signals are properly recovered in the correct time sequence. Such techniques have been referred to as framing circuits and so on.

Essentially, there is a need to provide a simplified multiplexing system to enable the transmission of a plurality of signals over a single transmission channel. While the technique to be described has many applications, there is a particular application which exists in aircraft or similar types of public transportation. For example, in a modern airliner each passenger location such as a passenger seat may receive a plurality of audio channels, each of which can be selected by the passenger to enable him to listen to any one of a wide variety of musical programs. As is ascertained, the wiring in the aircraft may be extremely complicated in order to direct each of the channels to the passenger location. If a multiplex system is employed, then there may be problems with synchronization and so on.

It is therefore an objective of the present invention to provide a simplified and efficient system which is capable of multiplexing a plurality of channels on a common transmission channel and then responding to the multiplexed wave to regenerate each of the channels at a receiving end. The system to be described employs a unique synchronization technique which is inherently part of the multiplex signal and which enables the receiver to regenerate a series of reference signals indicative of each of the multiplex channels.

BRIEF DESCRIPTION OF THE PREFERRED EMBODIMENT

A system for multiplexing a plurality of input signals to form a composite signal for transmission over a common transmission channel and for deriving replicas of said input signals at a receiver site from said composite transmitted signal comprising means for generating a reference signal, detecting means responsive to the amplitude of said reference signal for generating a series of proportional reference levels each separate one manifesting a separate input signal. A plurality of comparison means each associated with one input signal and each responsive to one reference signal to provide at an output a separate information signal indicative of the value of said input signal during said reference level. Summing means coupled to the outputs of said plurality of comparators to provide a summed signal indicative of the sum of the outputs of said comparators and manifesting said composite signal, receiver means responsive to said composite signal including means for detecting the amplitude of said composite signal for generating a series of proportional receiver reference signals each separate one manifesting a separate input signal and including a plurality of receiver comparison means each responsive to said composite signal and one of said receiver reference signals to provide at an output a replica of one of said input signals.

DETAILED DESCRIPTION OF THE FIGURES

Figure 1:
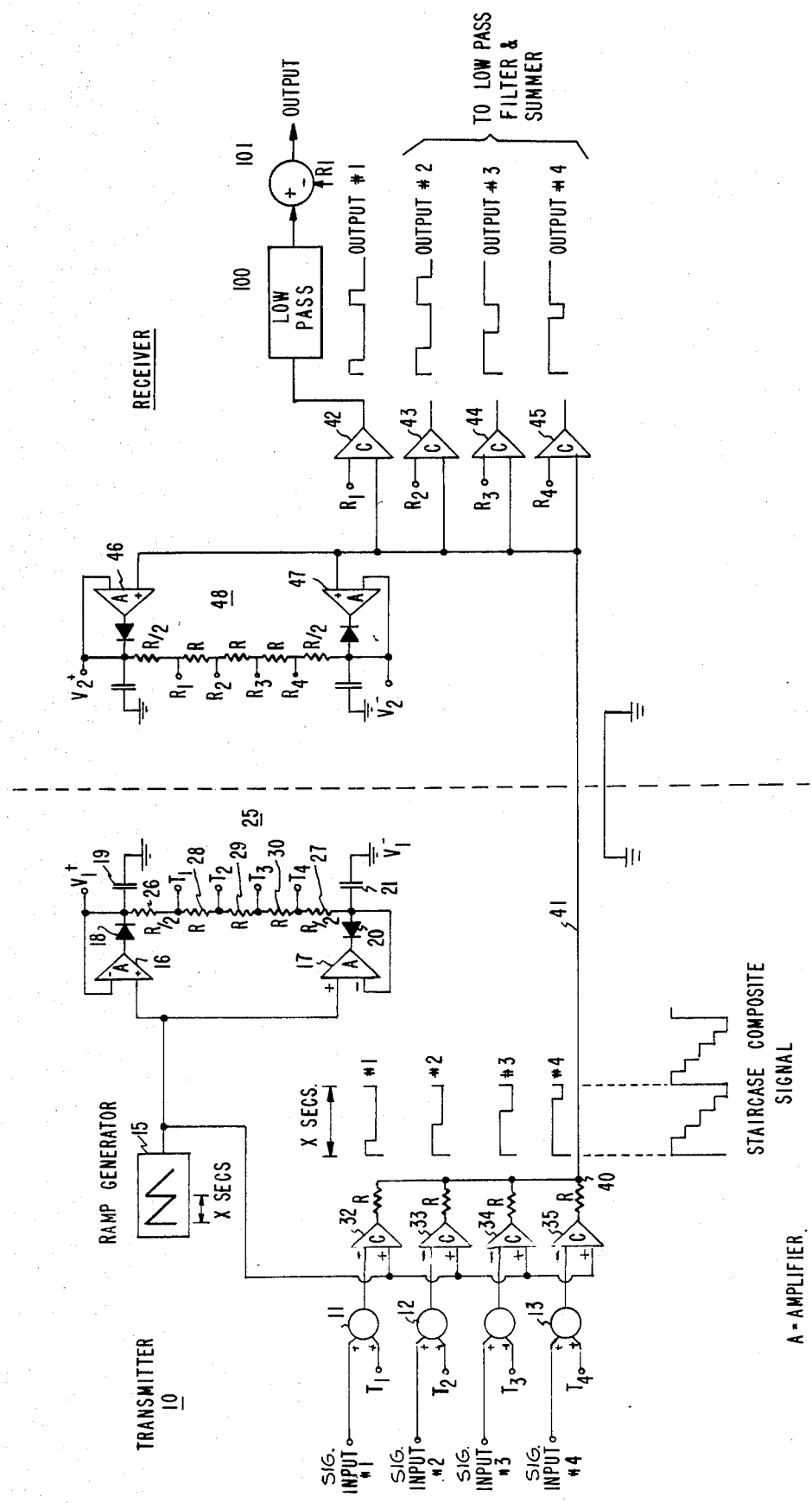
FIG. 1 is a simplifide blocked diagram of a multiplex system according to this invention.

Referring to FIG. 1, there is shown a simplified version of a multiplexing system according to this invention. For purposes of explanation, a four-channel system is described in FIG. 1. It being understood that the system can be employed to accommodate a greater number of channels as desired. The system described has particular utility when employed with analog signals such as audio signals but has applicability in the transission of any type of signal.

Referring to FIG. 1, there is shown a transmitter 10 which operates to multiplex four input channels designated as input No. 1 to input No. 4. Each input signal is designated as Sig. Input with the respective number following. The input signals may be conventional analog signals such as voice signals, music signals and so on. The input signals are each applied to one input of a summer. For example, input Signal No. 1 (Sig. Input #1) is applied to one terminal of summer 11, input Signal No. 2 (Sig. Input #2) to one input of the summer 12, and input Signal #4 to one input of the summer 13. The summers 11 to 13 are shown schematically but may be summing amplifiers or summing circuits, conventionally employed and available in various integrated circuit formats. As seen, the input signal is applied to one input of each summer while a derived reference signal disignated as $T_1$, $T_2$, and $T_4$ is applied to the other input of each. summer. The reference signals as $T_1$ are indicative of a threshold 6 signal which will cause the summer to provide an output equal to the sum of the DC threshold signal and the input signal. The reference signals are generated from a reference ramp generator 15. As will be further explained, the ramp generator 15 produces a ramp waveform which serves as a reference waveform for the multiplex system. The output of the ramp is applied to one input of each positive and negative peak detector 16 and 17. Essentially, peak detector 16 includes an amplifier having the anode of a diode 18 connected to the output with the cathode of the diode connected to a capacitor 19. The negative peak detector includes an amplifier 17 having its output connected to the cathode of a diode 20 with the anode of the diode connected to a capacitor 21.

The output of the ramp generator 15 is applied to the non-inverting terminals of the operational amplifiers 16 and 17. Located between the cathode of diode 18 and the anode of diode 20 is a series chain of resistors 25. As seen from the figure, there are five resistors wherein resistor 26 and resistor 27 are equal to each other; while resistors 28, 29 and 30 are also equal to each other but of twice the magnitude of resistors 26 and 27. The reference signals $T_1$ to $T_4$ are derived from taps between the resistors in the series chain 25. These reference signals or taps are applied to the input of amplifiers 11, 12 and 13 to develop the offset signal or reference signal for the amplifiers. Thus, as seen from the above description the reference ramp developed by generator 15 is peak detected to produce a DC voltage indicative of the amplitude of the ramp.

From this DC voltage, a series of reference voltages designated as $T_1$ to $T_4$ are generated and are applied to activate the input summers as summer 11. The output of the ramp generator 15 is also applied to one input of four comparators designated as 32 to 35. Another input of each comparator is obtained from the output of the respective input summer. Thus, comparator 32 is associated with summer 11 and has the ramp voltage applied to one input with the output of summer 11 applied to the other input. The outputs of each comparator are summed to produce a composite waveform at terminal 40. Essentially, each comparator is associated with a series resistor designated as R, which resistors have one terminal connected together to provide an arithmetic sum of the outputs from each comparator. The comparators 32 to 35 operate to compare the voltage developed by the ramp with the output signal from the input amplifier. The resultant output signal from each comparator is a pulse width modulated signal (PWM) where the width of the output pulses are a direct function of the information content of the input analog signal.

In this manner each comparator provides an output during the associated reference signals which is idicative of the amplitude of the input signal. These outputs from the comparator are summed to produce a staircase waveform as shown in FIG. 1. The staircase waveform is then transmitted via a common transmission channel 41 to a receiver location. At the receiver location, the staircase waveform is applied to the inputs of four receiving comparators designated as 42 to 45, each one of which is associated with one input channel as comparator 42 with channel 1, comparator 43 with channel 2, and so on. The staircase waveform is also applied to a positive and negative peak detector 46 and 47. Coupled between the outputs of the detectors are a series chain of resistors 48. The series chain 48 has 5 resistors of the magnitude or of the same ratios as resistors 26 to 30 of the series chain 25.

At the receiving end, the series of reference voltages designated as $R_1$ to $R_2$ are developed at the resistive taps and each signal is applied to a corresponding input of a comparator. In this manner, the comparator 42 receives the reference signal $R_1$. This signal determines the threshold for the comparator 42 which will now provide at its output the pulse generated by Input Signal 1. In a similar manner the output of comparator 43 provides the pulse generated by input channel 2 and so on. Thus, as can be seen, the receiver compares the staircase signal on transmission channel 41 with the reference signals developed by the peak detectors 46 and 47 across the resistive chain 48.

The outputs of each comparator at the receiver site is the pulse width modulated signal as that existing at the output of the transmitter comparators. This signal is converted to the original analog signal by directing the pulse signal to the input of a low pass filter 100, (shown for output #1). The output of the low pass filter 100 is then applied to an input of a receive summer 101, the other input of summer 101 receives the reference signal $R_1$ to subtract the DC bias component from the filtered signal. Thus, the output of the summer 101 is the original analog signal as that signal inputted to summer 11. Each receiver comparator as 42 to 45 has an associated low pass filter and summer as shown in FIG. 1 for ouput #1.

In the above described system, the actual amplitude of the staircase waveform is not critical as one is only concerned with a voltage which manifests a particular channel. This reference voltage is strictly determined by the positive and negative peak of the staircase waveform at the received channel. The reason that the system works is that the transmitted referenc signals, such as $T_1$ to $T_4$, are always in the same proportion as are the reference signals at the receive end. Therefore, $T_1$ is proportional to $T_2$ in the same exact manner as $R_1$ is proportional to $R_2$. In a similar manner $T_2$ is proportional to $T_4$ the same as $R_2$ is proportional to $R_4$ and so on. This also allows immediate recovery if transmission is interrupted.

In a typical audio system the audio signals prior to pulse width modulation may be typically limited to a 12 kHz band width. A ramp frequency is selected to be greater than 50 kHz. In this manner for an eight channel system, each channel would be sampled every 20 microseconds.

As seen from the above description, the reference or DC threshold voltages produced at the transmitter via the series chain 25 which is coupled between the output terminals of the positive and negative peak detectors are designated as $T_1$ to $T_4$. These reference levels represent a specified DC voltage each of which is indicative of a threshold level for the summers 11, 12, and 13. Thus, each summer is a DC amplifier which as a threshold level at the output determined by the reference levels $T_1$ through $T_4$. The input signal applied to the summer rides on this threshold signal. The comparators 32 to 35 generate an output signal when the reference ramp reaches the value determined by the threshold levels $T_1$ to $T_4$.

The DC values of $T_1$ to $T_4$ then determine the output pulse from the comparator. The output pulse from the comparator is always indicative of the amplitude of the analog signal which, as explained, is converted to a pulse width modulated signal by the action of the comparators.

Since all reference signals such as $T_1$ to $T_4$ and $R_1$ to $R_4$ are proportional, then the receiver will provide a replica of the pulse width modulated input signal at the output of the comparators 42 to 45. This signal is then filtered and summed to remove the receiver DC threshold levels.

Figure 2:
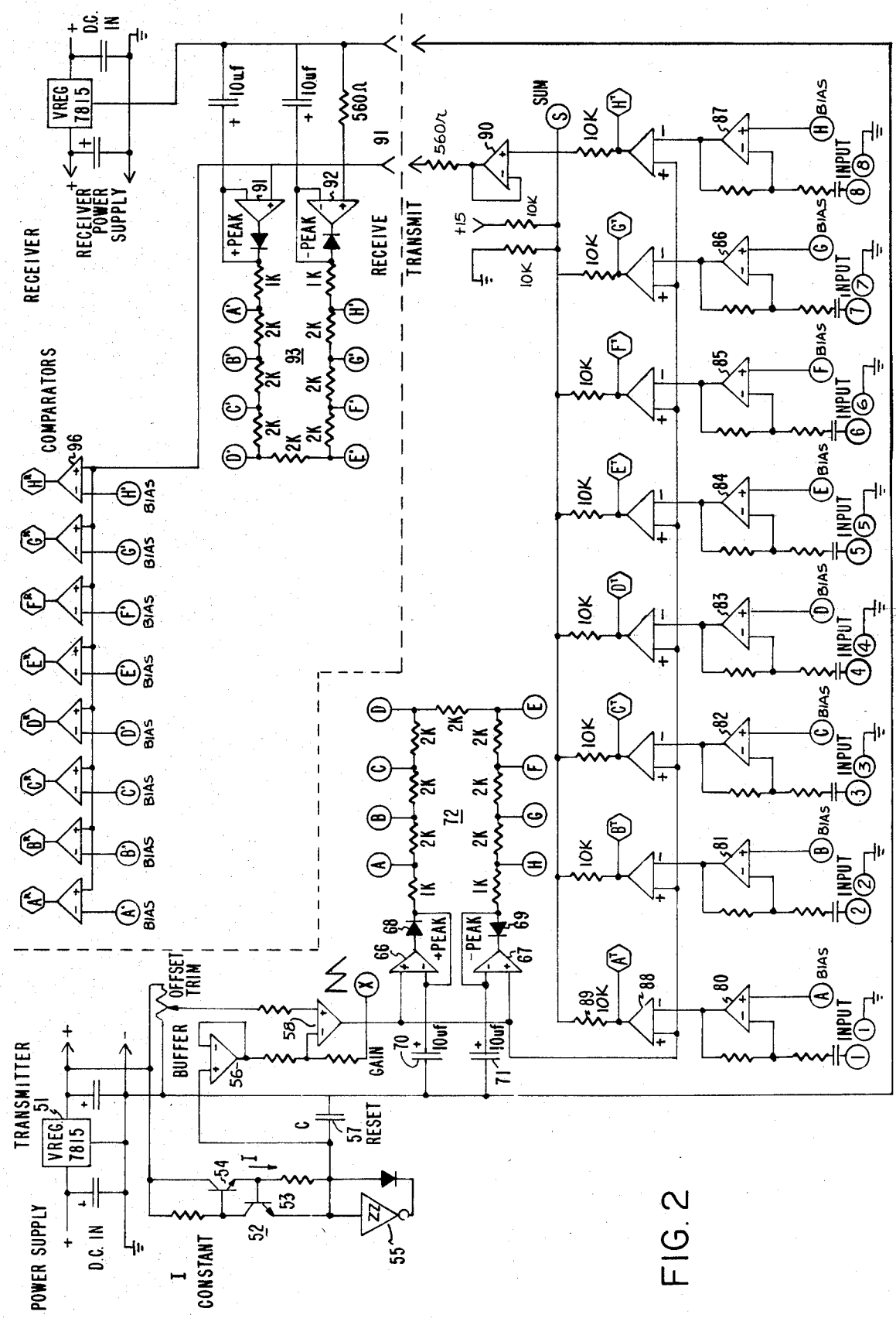
FIG. 2 is a detailed schematic diagram of an eight channel multiplex system according to this invention.

Referring to FIG. 2, there is shown a detailed schematic diagram of an eight channel multiplex system according to this invention. The transmitter 50 employs a DC potential source, such as a battery or other power supply which is used to provide a regulated voltage at the output of a voltage regulator 51. Examples of voltage regulators as 51 are well known in the art and such regulators are available in integrated circuit form. The output of the voltage regulator is applied to a ramp generator which essentially includes a constant current source 52. The constant current source 52 consists of two NPN transistors 53 and 54 connected as shown. The emitter of transistor 53 is coupled to the inverting input of a comparator with hysteresis 55 and is also coupled to a capacitor 57. The comparator 55 is a CMOS inverter Schmitt trigger such as that employed in the 40106IC. The two operational amplifiers 56 and 58 form the ramp generators as controlled by the Schmitt trigger and constant current source to provide at the output of amplifier 58 (designated as X) a ramp of accurate linearity. A linear ramp is preferable to obtain a completely linear response. The ramp waveform X is applied to the positive inputs of amplifiers 66 and 67 which form a postive and negative peak detector in conjunction with diodes 68 and 69. The capacitor 70 and 71 are part of the respective peak detectors The outputs from the positive and negative peak detectors 78 and 69 are directed through a series chain of resistors 72.

As seen in FIG. 2, there are nine resistors wherein the magnitude of each resistor is given on the circuit diagram. The taps between the resistors are designated as A to H. Each reference letter is shown within a circle so that the timing diagrams depicted in FIG. 3 can be understood. Essentially, the voltages A to H are the reference voltages or the threshold voltages developed at the transmitter as explained in FIG. 1 as voltages $T_1$ to $T_4$.

As shown in FIG. 2, there are eight summing amplifiers designated as 80 to 87. Each amplifier has one input which receives an analog input singal which signal is capacitively coupled thereto. In this manner the eight amplifiers 80 to 87 have a first input coupled to a separate analog signal. Thus, amplifier 80 at input No. 1 receives a first analog signal indicative of a first channel. The other inputs of each amplifier are coupled to the respective reference voltage as A through H; developed by the series chain 72; associated with the peak detectors 66 and 67. The output of each amplifier is connected to one input of a comparator such as comparator 88 for amplifier 80. To the input of each comparator there is applied the reference ramp signal as that signal designated as X which is the signal applied to the detectors. The outputs of the comparators are summed via summing resistors as 89 to develop a staircase waveform at the output designated as S (sum). The composite signal is then transmitted via a buffer 90 over a common transmission line 91 to the receiver. The receiver has two peak detectors 91 and 92 to which the received signal is applied. The peak detectors shown are again a positive and negative detector and have their outputs coupled between a series resistor chain 93 to develop proportional threshold or reference voltages designated as A' to H'. The received signal is also applied to one input of eight comparators as 96 where the reference singal is applied to the other input. The outputs of the comparators are now idicative of the pulse signals developed by the comparators as 88 at the transmission site. These signals are then filtered and have the DC components removed as described in FIG. 1.

The circuit shown in FIG. 2 is a detailed schematic circuit of an actual multiplex system according to this invention. All component values which are of importance are designated on the FIGURE. The operational amplifiers employed, as well as the comparators, are conventional components available in integrated circuit form and any one of a wide variety of such amplifiers will operate.

Essentially, as one can ascertain, the sawtooth reference signal determines the comparators frequency. As the threshold voltage varies, the output pulse duty cycle from the comparator will also vary. As the input voltage varies to the input summers, such as summer 80, the threshold voltage to the corresponding comparator also varies. In any event, the thresholds developed for each input amplifier are derived from the reference ramp. Therefore, if the ramp amplitude is increased, the delta voltage (V) between the thresholds increases thereby increasing the dynamic range of the input. Since the thresholds may vary, there is a dead band between channels which assures that there is no overlap between input signals. As can be seen, the receiver is electrically isolated from the transmitter, except by the common interconnecting cable which is the transmission medium or line.

Figure 3A:
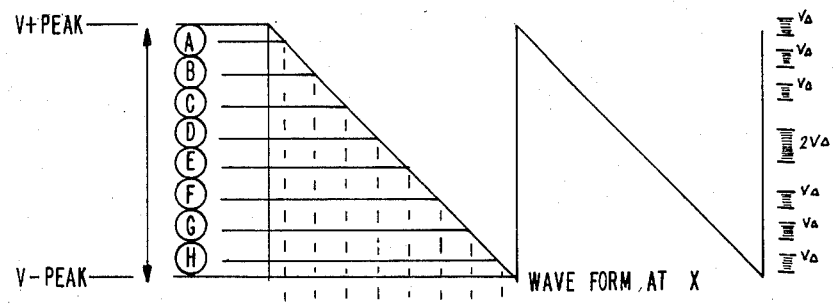
FIGS. 3A to 3D are a series of timing diagrams useful in explaining system operation.

Referring to FIG. 3A, there is shown a timing diagram depicting the threshold voltages designated as A through H as developed at the transmitter from the ramp applied to the positive and negative peak detectors. The period of the ramp determines the output pulse frequency of each comparator.

Figure 3B:
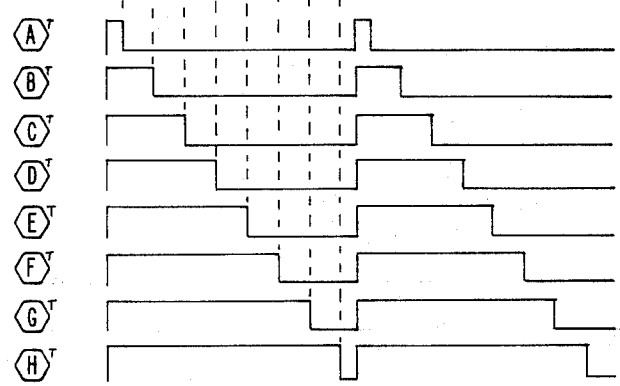

Referring to FIG. 3B, there is shown the individual outputs from each comparator as comparator 88 which shows the pulse width signal developed at the output of the comparators prior to summing the same. It is understood that the minimum pulse width, all signals are summed, determines the minimum transmission band width required. The pulse width corresponds to the time that the reference ramp of FIG. 3A is within each threshold. In this system there is no pulse duty cycle which is the same as another duty cycle. In this manner all input channels to the system have a different pulse duty cycle.

Figure 3C:
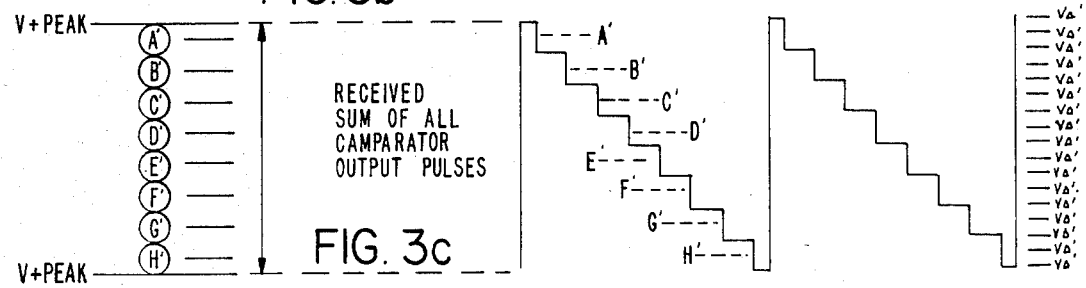

Referring to FIG. 3C, there is shown the waveform generated by the sums of the outputs of all the comparators. This is also the waveform received by the receiver and applied to peak detectors 91 and 92 at the receiver. The receiver reference voltage A' through H' are shown on FIG. 3C.

Figure 3D:
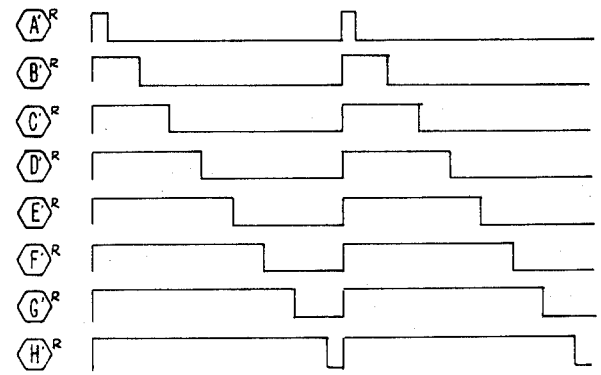

FIG. 3D depicts the output signals developed by comparing the receiver threshold to the received staircase waveform. It is noted that the output signals depicted in FIG. 3D are similar to the original pulse signals as shown in FIG. 3B and theoretically there is an infinite channel isolation achieved.

Thus, as can be seen from the above description, the system depicted relies on the generation of threshold signals which are directly proportional to one another. The composite signal developed at the transmitter which is a staircase waveform is then peak detected at the receiver to again develop a series of threshold signals which are again proportional to one another and which enable one to access the original input signals as mulitplexed at the transmitter. The system does not require any synchronization signal, but merely requires the transmission of the analog signal as explained.

In regard to system operation, the signal may vary in amplitude due to transmission line losses and so on. But any such variation will not effect the demultiplexing which occurs at the receiver.

In regard to the above described technique, there are many extensions of the original system concept which will be understood by one skilled in the art. For example, the encoding system may be segmented to allow synchronous encoding of various remote encode and transmite systems. For example, a common ramp may be used as a reference signal for two separate multiplex systems. In this manner the ramp signals from both systems may be slaved to the other for synchronous operation.

According to this technique, each transmitter signal may constitute a current source rather than the voltage source stepped waveform. In a current system, the signals will add provided that the two or more systems do not assign any common channels or that the input comparators are not biased to similar threshold points at the common ramp signals. Thus, the concept as described above widespread utility for various system applications.

As indicated above, the system operated with an audio signal having a band width of 12 kHz. The ramp generator signal was selected at a frequency of 50 kHz with a peak amplitude of eight volts. Each channel signal varied between one volt and with channel 1 starting at 0.5 volts, channel 2 at 1.5 volts, channel 3 at 2.5 volts and so on. With each input signal varying by plus or minus 0.5 volts within the ramp. The system allows wide channel separation after decoding, is extremely inexpensive, and provides simple decoding without concern for high frequency transmission.

There are numerous modifications and alternative configurations in which the concept described above can be employed. It is understood that such alterations and modifications will be apparent to those skilled in the art when reading the above specification, and all modifications and alternative configuration are therefore deemed to be encompassed within the spirit and scope of the claims appended hereto.

I claim:

1. A system for multiplexing a plurality of input signals to form a composite signal for transmission over a common transmission channel and for deriving replicas of said input signals at a receiver site from said composite transmitted signal, comprising means for generating a reference signal, detecting means responsive to the amplitude of said reference signal for generating a series of proportional reference levels each separate one indicative of and associated with a separate, one of said plurality of input signals, a plurality of comparison means each associated with one input signal and each responsive to one separate proportional reference level to provide at an output a separate information signal indicative of the value of said input signal according to the level of said associated proportional reference, summing means coupled to the outputs of said plurality of comparison means to provide a summed signal indicative of the sum of the outputs of said comparison means to provide a composite signal for transmission, receiver means responsive to said transmitted composite signal including means for detecting the amplitude of said composite signal for generating a series of proportional receiver reference signals each separate one indicative of a separate input signal and including a plurality of receiver comparison means each responsive to said composite signal and one of said receiver reference signals to provide at an output a replica of one of said input signals.

2. The system according to claim 1, wherein said refernce signal is a ramp of a given amplitude and width.

3. The system according to claim 1, wherein said detecting means includes a positive peak detector responsive to said ramp to provide a DC output indicative of the positive peak amplitude of said ramp, a negative peak detector responsive to said ramp to provide a negative DC output indicative of the negative peak amplitude of said ramp and impedance means coupled between the outputs of said peak detectors to provide said series of reference levels.

4. The system according to claim 3, wherein said impedance means comprises a series chain of resistors for developing a voltage across said chain with selected taps between said resistor indicative of a separate voltage reference level.

5. The system according to claim 1, wherein said plurality of input signals are a plurality of analog signals.

6. The system according to claim 5, wherein said comparison means further includes a plurality of amplifiers each having one input coupled to one input signal and another input coupled to a separate reference level associated with said input signal, each amplifier having a separate output terminal coupled to one input of an associated comparator with another input of said comparator coupled to said reference signal.

7. The system according to claim 1, wherein said composite signal is a staircase signal.

8. The system according to claim 1, wherein said means for detecting the amplitude of said composite signal includes a negative and positive peak detector, with a series chain of proportional resistors coupled between the output terminals of said detectors for generating said series of receiver reference signals.

9. A multiplex transmitter apparatus for multiplexing a plurality of input signals to form a composite signal for transmission over a common transmission channel, comprising:

means for generating an analog reference signal of a given amplitude amplitude detecting means responsive to said analog reference signal for generating a series of proportional threshold levels for each separate one of said input said threshold levels to provide at an output an information signal according to the level of said threshold level, where each output of each comparator has a varying pulse width according to the information content of said associated input signal, summing means coupled to the outputs of said comparator means for summing the same to provide a composite staircase signal indicative of the sum of the output information signals of said comparator means for transmission of said composite signal over said common transmission channel.

10. The multiplex transmitter apparatus according to claim 9, wherein said means for generating said analog reference signal is a ramp generator.

11. The multiplex transmitter apparatus according to claim 10, wherein said amplitude detecting means includes a positive peak detector responsive to said ramp for providing a DC output signal indicative of the positive peak value of said ramp amplitude, a negative peak detector responsive to said ramp for providing a DC output signal indicative of the negative peak value of said ramp amplitude, and a series chain of resistors coupled between the outputs of said detectors to provide said threshold levels between selected taps of said chain.

12. The multiplex transmitter apparatus according to claim 11, wherein said plurality of input signals are a plurality of analog signals.

13. The multiplex transmitter apparatus according to claim 12, wherein said composite signal is a staircase waveform having at least one step for each of said input signals.

14. A multiplex receiver apparatus for responding to a composite signal transmitted over a common transmission channel, said composite signal having a staircase format of a given amplitude, with each step in said staircase indicative of the value of a separate input signal, comprising:

detecting means responsive to said composite signal for providing a series of proportional threshold levels indicative of a portion of the amplitude of said composite signals, a plurality of comparators each responsive to said composite signal and one of said threshold levels for providing at an output of each comparator a separate signal indicative of one of said input signals, whereby each comparator provides at its output a different one of said input signals.

15. The multiplex receiver apparatus according to claim 14, wherein said detecting means includes a positive peak detector for providing a DC output indicative of the positive peak of said composite signal, a negative peak detector for providing a DC output indicative of the negative peak of said composite signal and impedance means coupled between the outputs of said detectors for providing said threshold levels.

16. The multiplex receiver apparatus according to claim 15, wherein said impedence means comprises a series chain of resistors with selected taps between resistors providing said threshold levels.

* * * * *